United States Patent [19]

Mathis

[11] Patent Number: 4,553,101
[45] Date of Patent: Nov. 12, 1985

[54] FAST FREQUENCY HOPPING DEMODULATION SYSTEM WITH SERIAL ACCUMULATION OF SIGNAL

[75] Inventor: Ronald F. Mathis, San Diego, Calif.

[73] Assignee: General Dynamis Electronics Division, San Diego, Calif.

[21] Appl. No.: 525,162

[22] Filed: Sep. 21, 1983

[51] Int. Cl.[4] .................... H03D 3/18; H03D 3/00; H03K 17/296

[52] U.S. Cl. .................... 329/50; 329/104; 329/122; 329/144; 329/146; 375/1; 375/80; 375/115; 370/3; 370/4; 370/50

[58] Field of Search .............. 329/50, 104, 105, 122, 329/141, 142, 143, 144, 146, DIG. 1; 375/1, 21, 80, 115; 455/26; 370/1, 3, 4, 50; 178/22.01

[56] References Cited

U.S. PATENT DOCUMENTS

| | | | |
|---|---|---|---|
| 3,676,684 | 7/1972 | De Lange | 370/1 X |
| 4,095,047 | 6/1978 | von Pieverling et al. | 375/115 |
| 4,271,524 | 6/1981 | Goodman et al. | 375/1 |
| 4,435,821 | 3/1984 | Ito et al. | 575/115 X |
| 4,443,799 | 4/1984 | Rubin | 375/1 X |
| 4,479,226 | 10/1984 | Prabhu et al. | 375/1 |

OTHER PUBLICATIONS

Grieco, D. M., "Application of Charge Coupled Devices to GPS Acquisition and Data Demodulation" *National Telecommunications Record Conference of the IEEE*, Birmingham, Ala., U.S.A., Dec. 1978, pp. 43.6/1-5.

Primary Examiner—Eugene R. LaRoche
Assistant Examiner—D. C. Mis
Attorney, Agent, or Firm—Brown, Martin & Haller

[57] ABSTRACT

A system for demodulating a received signal containing repetitive blocks of m frequency hopped pulses having a predetermined hopping sequence. "m" is an integer greater than one. The system includes m filters respectively tuned to the frequencies of the predetermined hopping sequence; a network for distributing the received signal to all m filters in parallel; and an integrator for integrating at an integer-multiple of the hop rate the output signals from the filters over an interval corresponding to the block of pulses to determine the time of arrival of the last pulse of each block. The filters are optical RF bandpass filters. The integrator includes a signal accumulator having a series of cells respectively coupled to different filters. Signals are accumulated in the cells from the filters at an integer-multiple of the hop rate and the accumulated signals are shifted serially from cell to cell at the integer-multiple of the hop rate to provide a serial output from an end cell. A detector detects when the serial output of the accumulator exceeds a predetermined threshold to thereby determine the arrival of each block. A charge coupled device (CCD) or a surface acoustic wave device (SAWD) is used as the accumulator to provide compactness and speed. The demodulation system can be programmed in accordance with a predetermined code pertaining to the sequence of the respective pulses in each block and/or in accordance with a predetermined binary output code.

22 Claims, 6 Drawing Figures

FAST FREQUENCY HOPPING DEMODULATION SYSTEM WITH SERIAL ACCUMULATION OF SIGNAL

BACKGROUND OF THE INVENTION

The present invention generally pertains to communications systems and is particularly directed to an improved fast frequency hopping demodulation system.

Fast frequency hopping is a communications technique wherein the communications signal contains repetitive blocks of a given number of pulses, with the pulses each having a different carrier frequency. As a result, the frequency "hops" from one frequency to another upon each successive pulse within each block. The fast-frequency-hopped signal is coded to provide a predetermined frequency hopping sequence within each block of pulses.

Fast frequency hopping systems are used to counteract selective frequency signal jamming techniques and to overcome the effects of noisy frequency bands and channels.

In the prior art fast frequency hopping demodulation is accomplished by correlating a frequency hopped sequence internally generated in a demodulator with the sequence of a received signal.

SUMMARY OF THE INVENTION

The system of the present invention utilizes integration of the received signal to improve the speed of recognition of the received signal as a fast-frequency-hopped signal having a predetermined hopping sequence.

The present invention is an improved system for demodulating a receiving signal containing repetitive blocks of m frequency hopped pulses having a predetermined hopping sequence. "m" is an integer greater than one. The system includes m filters respectively tuned to the frequencies of the predetermined hopping sequence; a circuit for distributing the received signal to all m filters in parallel; and an integrator for integrating at an integer-multiple of the hop rate the output signals from the filters over an interval corresponding to the block of pulses to determine the time of arrival of the last pulse of each block. Preferably, the integration rate is once or twice the hop rate. The integrator may include a signal accumulator having a series of cells respectively coupled to different filters, wherein signals are accumulated in the cells from the filters at the integer-multiple of the hop rate and accumulated signals progress serially from cell to cell at the integer-multiple of the hop rate to provide a serial output from an end cell; and a detector for detecting when the serial output of the accumulator exceeds a predeterined threshold to thereby determine the arrival of each block.

The present invention further provides a programmable fast frequency hopping demodulation system. In different aspects of the invention programmable demodulation is provided by utilizing multiple demodulator modules and by utilizing predetermined code switching, including a code having a binary output aspect.

The demodulation system of the present invention is particularly useful for communication links, spread spectrum data links and radar.

The present invention still further provides a system for demodulating a received signal containing repetitive blocks of m frequency hopped pulses selected from nm frequencies having a predetermined hopping sequence, wherein "m" and "n" are integers greater than one, and wherein the predetermined hopping sequence may vary from one block to the next, with the hopping sequence for each block being defined by a predetermined code. The system includes nm filters respectively tuned to said nm frequencies; a circuit for distributing the received signal to all nm filters in parallel; an integrator for integrating at an integer-multiple of the hop rate the output signals from selected filters tuned to the m frequencies that are selected during each sequential block to determine the time of arrival of the last pulse of each block; a programmable switching circuit for connecting the integrator to the selected filters in a programmable arrangement; and a code generator connected to the switching circuit for programming the switching circuit to connect the integrator to selected filters in accordance with the predetermined code so that during each sequential block the integrator integrates the respective filter output signals in a serial arrangement corresponding to the predetermined hopping sequence defined for the block by the predetermined code.

Additional features of the present invention are discussed in relation to the description of the preferred embodiments.

DESCRIPTION OF THE PREFERRED EMBODIMENTS

Figure 1:
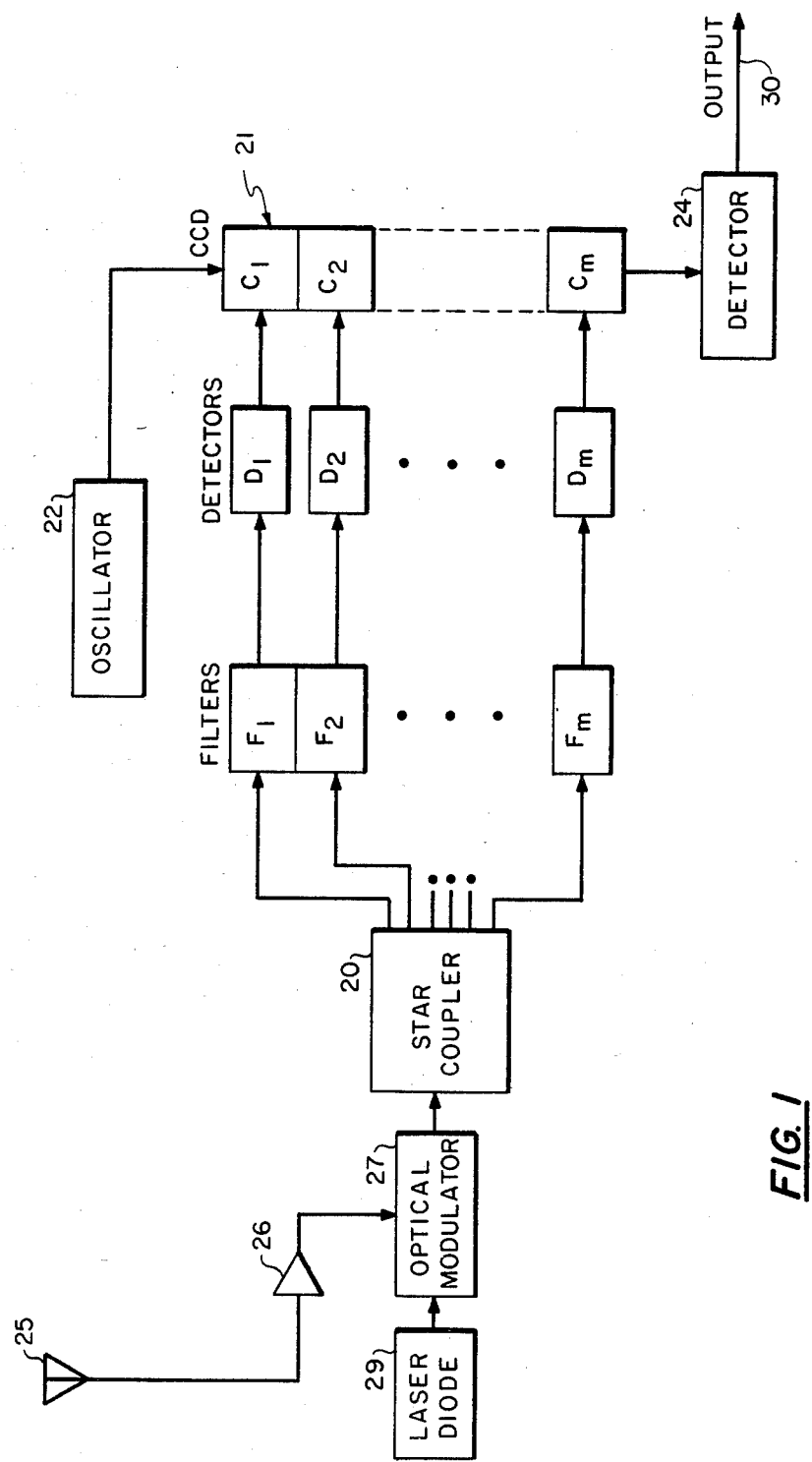
FIG. 1 is a block diagram of a preferred embodiment of a simple fast frequency hopping demodulation system according to the present invention.

Referring to FIG. 1 a simple preferred embodiment of the fast frequency hopping system of the present invention includes a star coupler 20, an array of m filters $f_1, F_2, \ldots, f_m$, an array of m detectors $D_1, D_2, \ldots, D_m$ and an integrator which includes a clocked signal accumulator 21, an oscillator 22 and a detector 24. In this embodiment a fast frequency hopped signal received by an antenna 25 is amplified by an input amplifier 26 and converted into an optical signal for demodulation processing. Such conversion is accomplished by an optical modulator 27 which modulates an optical signal from a laser diode 29 in accordance with the amplitude of the signal received from the amplifier 26. The star coupler 20 is a power divider.

The star coupler 20 distributes the fast frequency hopped signal from the optical modulator 27 to all m filters $f_1, f_2, \ldots, f_m$ in parallel. To provide signals of adequate amplitude to the filters, multiple combinations consisting of the laser diode 29, the optical modulator 27 and the star coupler 20 are connected in parallel to the output of the input amplifier 26 to provide the optically modulated received fast frequency hopped signal in parallel to different sets of filters within the array of m filters. The filters preferably are optical RF bandpass filters, which are compact and useful over a very wide frequency range. One type of optical filters are described in applicant's co-pending U.S. patent application Ser. No. 384,186, filed June 3, 1982, entitled "Optical Recursive Filter". These optical recursive RF bandpass filters include a multimode optical fiber segment having partially reflecting mirrors on each end and functions as a resonant cavity with respect to the modulation frequency when the length of the fiber is equal to one-half the modulation wavelength of the injected light in that fiber. In one embodiment, modulated noncoherent light is injected into the fiber section by means of a directional coupler. Resonance occurs at the frequency of the modulation on the carrier and the output is provided through the mirror at one end of the fiber segment. In another embodiment, the fiber element functions in the same manner but the modulated light is injected through a hole in the mirror on one end, preferably by means of a single mode fiber. The light so injected may be modulated coherent light but upon entry in the fiber resonant cavity, it is subject to multimodal propagation resulting in dispersion so that it functions in the manner of the filter described above. Separate detectors $D_1, D_2, \ldots, D_m$ are respectively connected to the outputs of each of the filters $f_1, f_2, \ldots, f_m$. Each of the detectors provides an internal electrical signal that is proportional to the intensity of the light passed through the filter and further provides an output electrical signal that is proportional to the amplitude of the modulation of the internal signal.

Alternatively, the received signal from the amplifier 26 is distributed by an electrical signal star coupler to electrical signal filters $f_1, f_2, \ldots, f_m$.

The signal accumulator 21 is a charge coupled device (CCD).

The signal accumulator 21 has a series of cells $C_1, C_2, \ldots, C_m$ respectively coupled by the detectors $D_1, D_2, \ldots, D_m$ to the filters $f_1, f_2, \ldots, f_m$. The inputs and the serial progression of the accumulator 21 are clocked at the hop rate by the oscillator 22. When the accumulator 21 is clocked, signals are accumulated in the cells from the filters and accumulated signals progress serially from cell to cell to provide a serial output from an end cell $C_m$ to the detector 24. The detector 24 detects when the serial output of the accumulator 21 exceeds a predetermined threshold to thereby determine the presence and time of arrival of each block, and thereupon provides an output pulse on line 30.

The function of the signal accumulator 21 could be performed by a computer. However, the CCD provides the advantage of compactness. Presently available CCD's are useful with hop rates of up to about 5 megahops per second.

The demodulation system of FIG. 1 is designed to demodulate fast frequency hopped signals in which the sequence of the frequencies does not vary from one block to the next. The predetermined hopping sequence for the system of FIG. 1 is defined by the serial order of the different frequencies that are assigned to the different filters. The filters $f_1, f_2, \ldots, f_m$ are connected respectively to the series of cells $C_1, C_2, \ldots, C_m$ of the signal accumulator 21.

When the frequency hopping sequence of the signal received by the demodulation system is the same as the predetermined hopping sequence the signals provided to the respective cells of the signal accumulator 21 will add to produce a maximum output above a predetermined threshold that is detected by the detector 24 to determine the presence and time of arrival of each block. Otherwise the output from the signal accumulator 21 will remain minimal.

As noted, the demodulation system of FIG. 1 operates with only a single fixed frequency hopping sequence. The utility of the demodulation system is enhanced by providing programmable demodulation.

Figure 2:
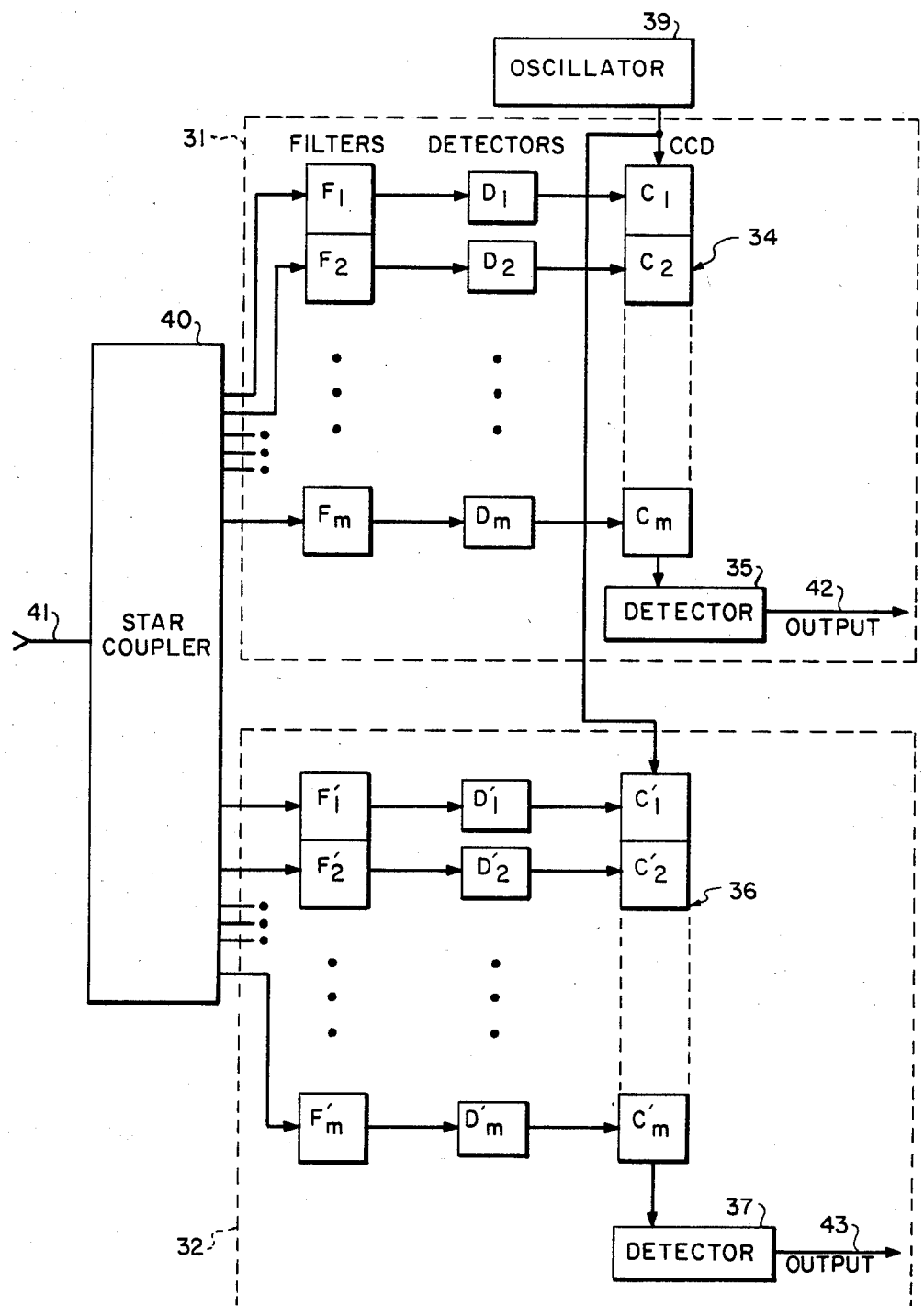
FIG. 2 is a block diagram of a preferred embodiment of a fast frequency hopping demodulation system according to the present invention utilizing multiple demodulator modules to provide programmable demodulation.

The demodulation system of FIG. 2 provides programmable demodulation by utilizing multiple demodulator modules 31 and 32.

One module 31 includes an array of filters $f_1, f_2, \ldots, f_m$, an array of detectors $D_1, D_2, \ldots, D_m$, a signal accumulator 34 and a detector 35 which are interconnected and function in the same manner as the like-components in the demodulator system of FIG. 1.

A second module 32 includes an array of filters $f'_1, f'_2, \ldots, f'_m$, an array of detectors $D'_1, D'_2, \ldots, D'_m$, a signal accumulator 36 and a detector 37, which also are interconnected and function in the same manner as the like components in the demodulator system of FIG. 1.

An oscillator 39 is common to all of the modules 31, 32 and is connected to the signal accumulators 34 and 36 for clocking them at the hop rate of the predetermined fast frequency hopped signals for which the demodulator system is designed.

A star coupler 40 distributes a fast frequency hopped signal received on line 41 in parallel to each of the filters in each of the modules 31, 32. The portion of the system of FIG. 2 providing the received signal on line 41 to the star coupler is the same as in the system of FIG. 1.

The sequence of frequencies assigned to the filters of the respective modules 31, 32 is different for each module. Accordingly, an output pulse is provided on line 42 from the detector 35 of the first module 31 only when the frequency sequence in each repetitive block of the received fast frequency hopped signal is $f_1, f_2, \ldots, f_m$; and an output pulse is provided on line 43 from the detector 37 of the second module 32 only when the frequency sequence in each repetitive block of the received faste frequency hopped signal is $f'_1, f'_2, \ldots, f'_m$.

In an application requiring a fixed number of predetermined messages, the demodulator system includes a corresponding number of modules, each of which has a unique code defined by the serial order of the different frequencies assigned to the filters of such module. Receipt of a specific message will be indicated by identification of the particular module from which the output pulse is received. This system can readily accommodate a large number of different messages. For example, if 128 frequency hopped channels are available for use and messages are sent in blocks of 32 different frequencies in each repetitive block, then there are more than 1067 unique codes to choose from.

Another approach to programmable demodulation is to vary the hopping sequence in the fast frequency hopped signal from one block to the next and to use a combination of a switching circuit and a code generator in the demodulator system to vary the serial connection of the filters to the integrator from one block to the next in accordance with the variation in the hopping sequence. This approach is utilized by the demodulation system shown in FIG. 3.

Figure 3:
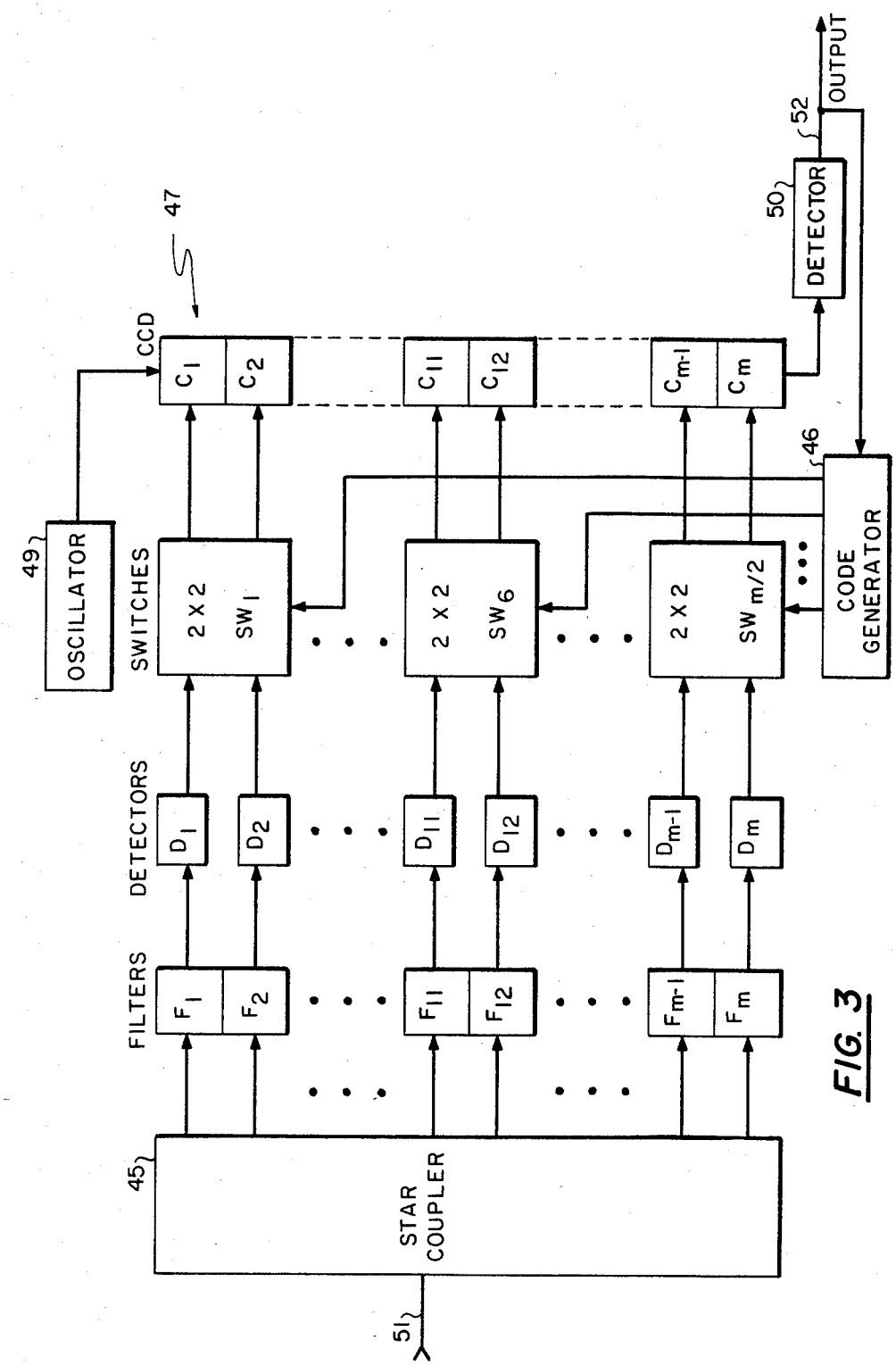
FIG. 3 is a block diagram of a preferred embodiment of a fast frequency demodulation system of the present invention utilizing predetermined code switching to provide programmable demodulation.

The demodulation system of FIG. 3 includes a star coupler 45, an array of m filters $f_1, f_2, \ldots, f_{11}, f_{12}, \ldots, f_{m-1}$ and $f_m$, a corresponding array of m detectors $D_1, D_2, \ldots, D_{11}, D_{12}, \ldots, D_{m-1}$ and $D_m$ respectively connected to the outputs of the filters, a programmable switching circuit including an array of m/2 switches $SW_1, \ldots, SW_6, \ldots, SW_{m/2}$, a code generator 46 and an integrator. The integrator includes a clocked signal accumulator 47, an oscillator 49 and a detector 50.

The switches are two-by-two (2×2) switches. For example, in one of two possible switch positions, the switch $SW_1$ provides the output of the detector $D_1$ to the cell $C_1$ and the output of the detector $D_2$ to the cell $C_2$, whereas in the other switch position, the switch $SW_2$ provides the output of the detector $D_1$ to the cell $C_2$ and the output of the detector $D_2$ to the cell $C_1$. In alternative embodiments the switches can be n×n switches (wherein "n" is an integer greater than 2) to provide more complex coding possibilities.

The programmable switching circuit $SW_1, \ldots, SW_6, \ldots, SW_{m/2}$ respectively connect the cells $C_1, C_2, \ldots C_{11}, C_{12}, \ldots, C_{m-1}, C_m$ of the accumulator 47 via the detectors to different filters $f_1, F_2, \ldots, f_{11}, f_{12}, \ldots, f_{m-1}, f_m$ in a programmable serial arrangement.

The star coupler 45 distributes the fast frequency hopped signal received on line 51 to all m filters $f_1, f_2, \ldots, f_{11}, f_{12}, \ldots, f_{m-1}, f_m$ in parallel. Separate detectors $D_1, D_2, \ldots, D_{11}, D_{12}, \ldots, D_{m-1}, D_m$ are respectively connected to the outputs of each of the filters $f_1, f_2, \ldots, f_{11}, f_{12}, \ldots, f_{m-1}, f_m$. The portion of the system of FIG. 3 providing the received signal on line 51 to the star coupler 45 is the same as in the system of FIG. 1.

In the received signal on line 51, the predetermined hopping sequence may vary from one block to the next, with the hopping sequence for each block being defined by a predetermined code.

The code generator 46 is connected to the switching circuit $SW_1, \ldots, SW_6, \ldots, SW_{m/2}$ for programming the switching circuit to connect the cells of the accumulator 47 to the filters during each sequential block in a serial arrangement corresponding to the predetermined hopping sequence defined for the block by the predetermined code.

The accumulator 47 is a CCD. The parallel inputs and the serial progression of the accumulator 47 are clocked at the hop rate by the oscillator 49. The accumulator 47 functions in the same manner as the accumulator 21 in the system of FIG. 1. When the accumulator 47 is clocked, signals are accumulated in the cells from the filters and the accumulated signals progress serially from cell to cell to provide a serial output from the end cell $C_m$.

When the frequency hopping sequence of the signal received by the demodulation system is the same as the predetermined hopping sequence the signals provided to the respective cells of the signal accumulator 47 will add to produce a maximum output above a predetermined threshold that is detected by the detector 50 to determine the presence and time of arrival of each block. Otherwise the output from the signal accumulator 47 will remain minimal. When the predetermined threshold is exceeded, the detector 50 provides an output pulse on line 52.

The code generator 46 is initially set to a predetermined recognition code, and acquires synchronization with the received fast frequency hopped signal on line 51 in response to the output pulse on line 52 from the detector 50.

Figure 4:
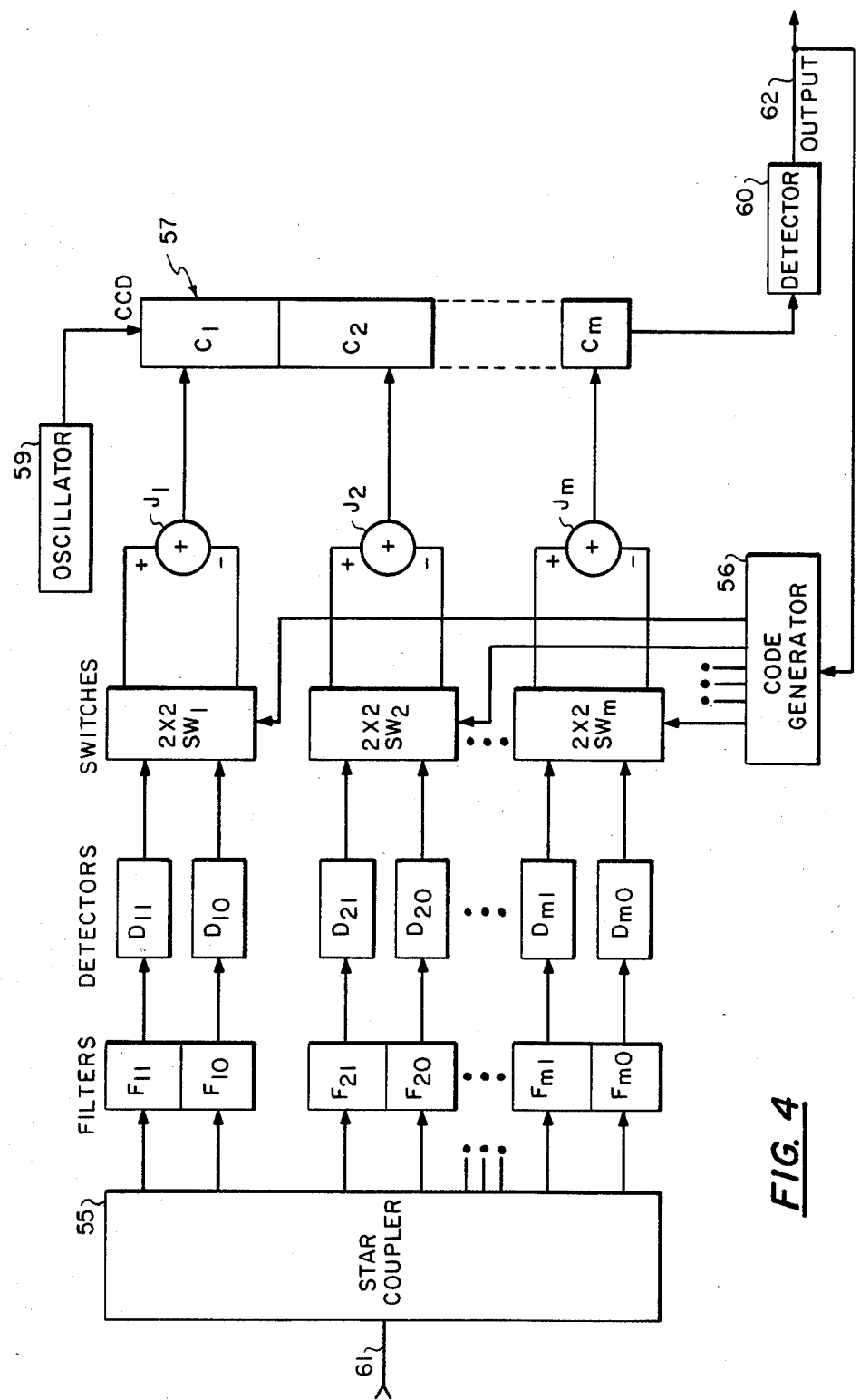
FIG. 4 is a block diagram of a preferred embodiment of a fast frequency demodulation system according to the present invention utilizing nm filters in combination with predetermined code switching to provide programmable demodulation.

A programmable demodulation system utilizing a binary code is shown in FIG. 4. The demodulation system of FIG. 4 includes a star coupler 55, an array of n-times-m Filters $f_{11}, f_{10}, f_{21}, f_{20}, \ldots, f_{m1}, \ldots, f_{m0}$; a corresponding array of detectors $D_{11}, D_{10}, \ldots, D_{21}, D_{20}, \ldots, D_{m1}, D_{m0}$; a programmable switching circuit including an array of m2×2 switches $SW_1, SW_2, \ldots, SW_m$ and a corresponding array of m differential circuits $J_1, J_2, \ldots, J_m$; a code generator 56 and an integrator. The integrator includes a signal accumulator 57, an oscillator 59 and a detector 60. "m" and "n" are integer greater than one. In this embodiment n equals 2, since a binary code is used. In other embodiments using a more complex code n would be greater than 2.

The switches are 2×2 switches, the same as used in the embodiment of FIG. 3.

The m differential circuits $J_1, J_2, \ldots, J_m$ have their outputs respectively connected to different individual cells $C_1, C_2, \ldots, C_m$ of the accumulator 57. Each differential circuit has two opposite polarity inputs; means for reversing the polarity of a signal received at one input; and means for combining the reversed polarity input signal with a signal received at the other input to produce an output signal that is provided to the respective cell of the accumulator 57. The system of FIG. 4 demodulates a received signal on line 61 containing repetitive blocks of m frequency hopped pulses selected from nm frequencies having a predetermined hopping sequence, wherein the determined hopping sequence may vary from one block to the next, with the hopping sequence for each block being defined by a predetermined code having a binary output aspect.

There are nm filters tuned to the nm frequencies. There are m groups of filters, defining m groups of frequenices. With each group including n filters. In this embodiment there are two filters in each group. During each block of the fast frequency hopped signal, the m selected frequencies include one frequency from each group of filter frequencies.

The star coupler 55 distributes the fast frequency hopped signal received on line 61 to all nm filters $f_{11}, f_{10}, f_{21}, f_{20}, \ldots, f_{m1}, f_{m0}$ in parallel. Separate detectors $D_{11}, D_{10}, D_{21}, D_{20}, \ldots, D_{m1}, D_{m0}$ are respectively connected to the outputs of each of the filters $f_{11}, f_{10}, f_{21}, f_{20}, \ldots f_{m1}, f_{m0}$. The portion of the system of FIG. 4 providing the received signal on line 61 to the star coupler 55 is the same as in the system of FIG. 1.

The m switches $SW_1, SW_2, \ldots, SW_m$ respectively connect the 2m inputs of the m differential circuits $J_1, J_2, \ldots, J_m$ via the detectors to the outputs of different pairs of the 2m filters $f_{11}, f_{10}, f_{21}, f_{20}, \ldots, f_{m1}, f_{m0}$. Each of the switches is programmable for selectively reversing the connections between the two differential circuit inputs and the respective pair of filter outputs in accordance with the predetermined code.

The code generator 56 programs the programmable switching circuit so that one filter of each pair of filters passes signals having one of the selected frequencies during each sequential block and so that all of the signals having the selected frequencies during each sequential block are provided to an input of the same polarity in the differential circuits to cause all of the signals that are provided to the accumulator 57 during any given sequential block to be either one polarity or the opposite polarity in accordance with the binary output aspect of the predetermined code. The detector detects when the serial output of the accumulator 57 exceeds a first predetermined threshold to determine arrival of a sequential block of one binary value and further detects when said serial output exceeds a second predetermined threshold to determine arrival of a sequential block of the opposite binary value.

The accumulator 57 is a CCD. The inputs and the serial progression of the accumulator 57 are clocked at the hop rate by the oscillator 59. The accumulator functions in the same manner as the accumulator in the system of FIG. 1. When the accumulator 57 is clocked, signals are accumulated in the cells from the filters and accumulated signals progress serially from cell to cell to provide a serial output from the end cell $C_m$.

When the frequency hopping sequence of the signal received by the demodulation system is the same as the predetermined hopping sequence the signals provided to the respective cells of the signal accumulator 57 will add to produce a maximum output exceeding a first predetermined threshold when all of the signals provided to the accumulator 57 from the switching circuit during the sequential block are of one polarity, and to produce a maximum output exceeding a second predetermined threshold when all of the signals provided to the accumulator 57 from the switching circuit during the sequential block are of the opposite polarity. Otherwise, the output from the signal accumulator 57 will remain minimal.

When the detector 60 detects a serial output signal from the accumulator 57 that exceeds either the first or second predetermined threshold, the detector thereby determines the presence and time of arrival of the block and provides an output pulse on line 62. The character of the output pulse on line 62 depends upon whether the first or second predetermined threshold was exceeded and thereby is binary. In the preferred embodiment the output pulse on line 62 is of a first duration when the first threshold is exceeded and of a second duration when the second threshold is exceeded.

The code generator 56 is initially set to a predetermined recognition code and acquires synchronization with the code of the received fast frequency hopped signal on line 61 in response to an output pulse on line 62 from the detector 60.

In each of the embodiments of FIGS. 2, 3, and 4, multiple combinations consisting of a laser diode, optical modulator and star coupler may be connected in parallel to the output of an input amplifier, such as the amplifier 26, in order to provide optically modulated received fast frequency hopped signals of adequate amplitude in parallel to different sets of filters within the filter array.

Figure 5:
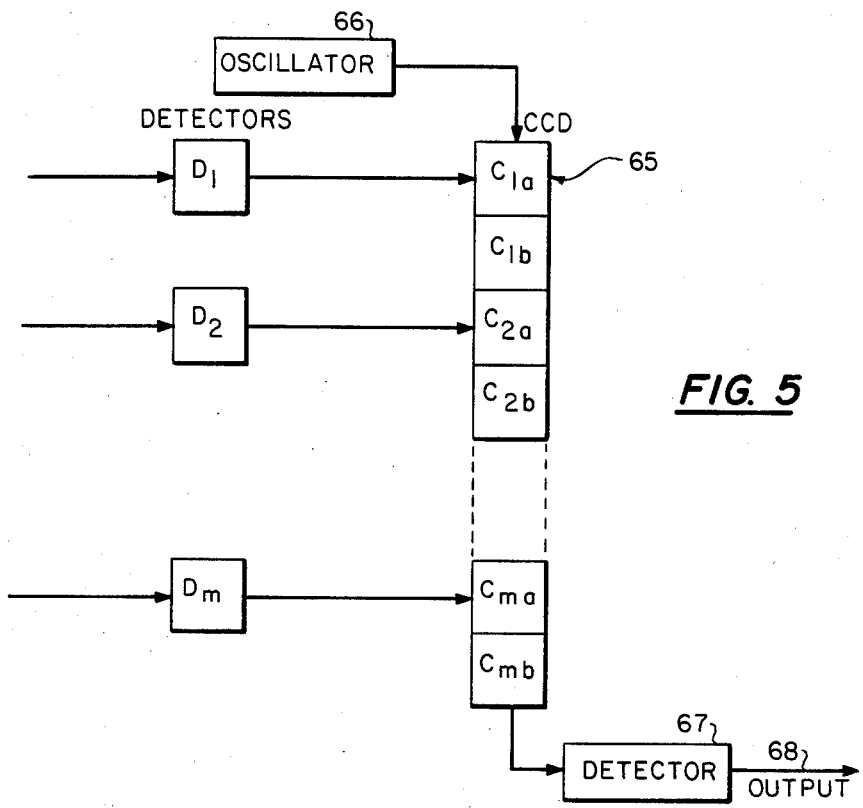
FIG. 5 is a block diagram showing an alternative preferred embodiment of the integrator of the demodulation systems shown in FIGS. 1 to 4, for integrating at twice the hop rate.

Referring to FIG. 5, an embodiment of the integrator of the Systems of FIGS. 1-4 is shown wherein integration takes place at twice the hop rate. The integrator includes a signal accumulator 65, an oscillator 66 and a detector 67. The signal accumulator is a CCD having a series of 2m cells $C_{1a}$, $C_{1b}$, $C_{2a}$, $C_{2b}$, . . . , $C_{ma}$, $C_{mb}$ coupled by the detectors $D_1$, $D_2$, . . . , $D_m$ to the different filters $f_1$, $f_2$, . . . , $f_m$. The outputs of the detectors are respectively connected to every other cell beginning with the first cell in the series $C_{1a}$.

The inputs and the serial progression of the accumulator 65 are clocked at twice the hop rate by the oscillator 66. When the accumulator 65 is clocked, signals are accumulated in the cells from the filters and accumulated signals progress serially from cell to cell to provide a serial output from the end cell $C_{mb}$ to the detector 67. The detector 67 detects when the serial output of the accumulator 65 exceeds a predetermined threshold to thereby determine the presence and time of arrival of each block, and thereupon provides an output pulse on line 68.

By providing twice as many cells in the accumulator 65 and clocking the accumulator 65 at twice the hop rate, the accumulator 65 is able to more accurately sample and accumulate signal pulse that are detected from the filters during the intervals between clocking transitions. Alternatively, duplicate integrators, such as shown in FIGS. 1-4, can be used with the clocking signals for the respective integrators being offset by 180 degrees from each other.

Figure 6:
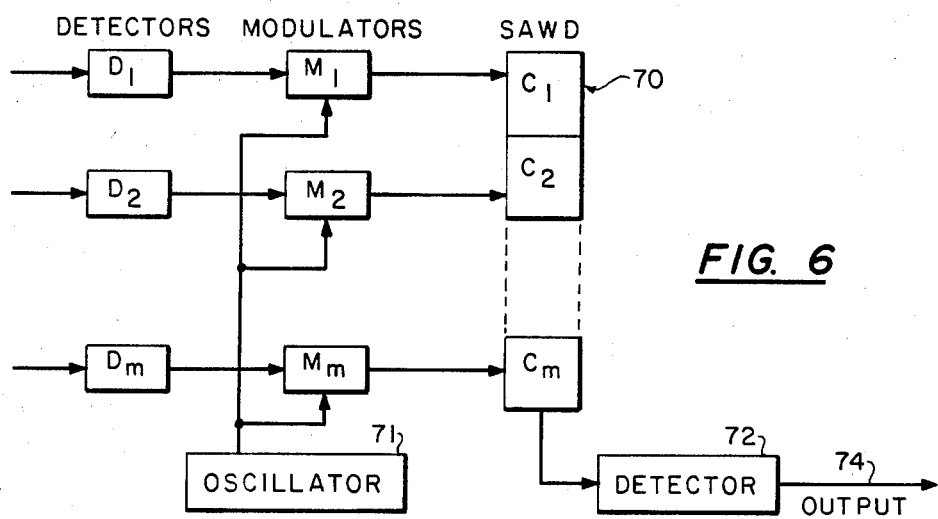
FIG. 6 is a block diagram showing another alternative preferred embodiment of the integrator of the demodulation systems shown in FIGS. 1 to 4, including a surface acoustic wave device.

A preferred embodiment of the integrator of the systems of FIGS. 1, 2, 3, and 4, that is operable at higher hop rates than an integrator including a CCD accumulator is shown in FIG. 6. The integrator of FIG. 6 includes a signal accumulator 70, an array of modulators $M_1$, $M_2$, . . . , $M_m$, an oscillator 71 and a detector 72.

The signal accumulator 70 is a surface acoustic wave device (SAWD). The SAWD is configured with a series of m interdigital transducers. The signal accumulator 70 has a series of cells $C_1$, $C_2$, . . . , $C_m$ respectively coupled by an array of modulators $M_1$, $M_2$, . . . , $M_m$, to different detectors $D_1$, $D_2$, . . . $D_m$. Therefore, the modulator $M_1$ is connected in series between the cell $C_1$ and the filter $f_1$, etc. The cells of the SAWD 70 are defined by the positions at which the electrodes providing the signals from the modulators are connected thereto. The electrodes are positioned so that the time required for a surface wave to propagate between adjacent cells of a SAWD corresponds to the interval between frequency hops. A SAWD is useful with higher hop rates than the 5 megahops per second rate that can be used with presently available CCD's.

Each of the modulators $M_1$, $M_2$, . . . , $M_m$ provides a signal to drive the cell of the SAWD 70 to which it is connected.

The amplitude of the signal driving each cell of the SAWD 70 is proportional to the amplitude of the corresponding filter output detected by the detector connected to the respective modulator. The oscillator 71 is connected to all of the modulators to cause all of the drive signals from the modulators $M_1$, $M_2$, . . . , $M_m$ to the respective cells of the SAWD 70 to be in phase with each other.

When the frequency hopping sequence of the signal received by the demodulation system is the same as the predetermined hopping sequence the signals provided to the respective cells of the signal accumulator 70 will add in phase to produce a maximum output above a predetermined threshold that is detected by the detector 72 to determine the presence and time of arrival of each block. Otherwise the output from the signal accumulator 70 will remain minimal. When the predetermined threshold is exceeded, an output pulse is provided by the detector 72 on line 74.

I claim:

1. A system for demodulating a received signal containing repetitive blocks of m frequency hopped pulses having a predetermined hopping sequence, where "m" is an integer greater than one, comprising m filters respectively tuned to the frequencies of said predetermined hopping sequence;

means for distributing said received signal to all m filters in parallel; and means for integrating the output signals from said filters over intervals each corresponding to a respective one of said blocks of pulses, said integrating means comprises a signal accumulator having a series of cells respectively coupled to different filters, wherein signals are accumulated in the cells from the filters at the integer-multiple of the hop rate and accumulated signals progress serially from cell to cell at the integer-multiple of the hop rate to provide a serial output from an end cell, and means for detecting when the serial output of the accumulator exceeds a predetermined threshold to determine the arrival of each block.

2. A system according to claim 1, wherein the predetermined hopping sequence may vary from one block to the next, with the hopping sequence for each block being defined by a predetermined code, the system further comprising a programmable switching circuit for connecting the cells of the accumulator in parallel to the filters in a programmable serial arrangement; and a code generator connected to the switching circuit for programming the switching circuit to connect the cells of the accumulator to the filters during each sequential block in a serial arrangement corresponding to the predetermined hopping sequence defined for said block by the predetermined code.

3. A system according to claim 1, comprising a programmable switching circuit for connecting the cells of the accumulator to the filters in a programmable arrangement;

a code generator connected to the switching circuit for programming the switching circuit to connect the cells of the accumulator to the filters so that all of the signals that are provided from the switching circuit to the accumulator during any selected sequential block are either one polarity or an opposite polarity in accordance with a predetermined binary code; and wherein the detecting means of the integrating means detects when the serial output of the accumulator exceeds a first predetermined threshold to determine arrival of a sequential block of one binary value and further detects when said serial output exceeds a second predetermined threshold to determine arrival of a sequential block of the opposite binary value.

4. A system according to claim 1, wherein the filters are optical RF bandpass filters.

5. A system for demodulating a received signal containing repetitive blocks of m frequency hopped pulses having a predetermined hopping sequence, where "m" is an integer greater than one, comprising m filters respectively turned to the frequencies of said predetermined hopping sequence;

means for distributing said received signal to all m filters in parallel; and means for integrating the output signals from said filters over intervals each corresponding to a respective one of said blocks of pulses said integrating means comprises a charge coupled device clocked signal accumulator having a series of cells respectively coupled to different filters, wherein when the accumulator is clocked, signals are accumulated in the cells from the filters and accumulated signals progress serially from cell to cell to provide a serial output from an end cell, means for clocking the input and the serial progression of the accumulator at the integer-multiple of the hop rate, and means for detecting when the serial output of the accumulator exceeds a predetermined threshold to determine the time of arrival of the last pulse of each block.

6. A system according to claim 5, wherein the filters are optical RF bandpass filters.

7. A system according to claim 5, wherein the predetermined hopping sequence may vary from one block to the next, with the hopping sequence for each block being defined by a predetermined code, the system further comprising a programmable switching circuit for connecting the cells of the accumulator in parallel to the filters in a programmable serial arrangement; and a code generator connected to the switching circuit for programming the switching circuit to connect the cells of the accumulator to the filters during each sequential block in a serial arrangement corresponding to the predetermined hopping sequence defined for said block by the predetermined code.

8. A system according to claim 5, comprising a programmable switching circuit for connecting the cells of the accumulator to the filters in a programmable arrangement;

a code generator connected to the switching circuit for programming the switching circuit to connect the cells of the accumulator to the filters so that all of the signals that are provided from the switching circuit to the accumulator during any selected sequential block are either one polarity or an opposite polarity in accordance with a predetermined binary code; and wherein the detecting means of the integrating means detects when the serial output of the accumulator exceeds a first predetermined threshold to determine arrival of a sequential block of one binary value and further detects when said serial output exceeds a second predetermined threshold to determine the arrival of a sequential block of the opposite binary value.

9. A system for demodulating a received signal containing repetitive blocks of m frequency hopped pulses having a predetermined hopping sequence, where "m" is an integer greater than one, comprising m filters respectively tuned to the frequencies of said predetermined hopping sequence;

means for distributing said received signal to all m filters in parallel; and means for integrating the output signals from said filters over intervals each corresponding to a respective one of said blocks of pulses said integrating means comprises a surface acoustic wave device (SAWD) having a series of cells respectively coupled to different filters and spaced so that the time required for a surface wave to propagate between adjacent cells corresponds to the interval between frequency hops said surface wave provided as a serial output from the SAWD;

an array of modulators respectively connected in series between the respective cells of the SAWD and the filters of the filter array for driving the respective cells in proportion to the amplitude of the corresponding filter output; and means for detecting when the serial output of the SAWD exceeds a predetermined threshold to determine the arrival of each block.

10. A system according to claim 9, wherein the filters are optical RF bandpass filters.

11. A system according to claim 9, wherein the predetermined hopping sequence may vary from one block to the next, with the hopping sequence for each block being defined by a predetermined code, the system further comprising a programmable switching circuit for connecting the cells of the SAWD in parallel to the filters in a programmable serial arrangement; and a code generator connected to the switching circuit for programming the switching circuit to connect the cells of the SAWD to the filters during each sequential block in a serial arrangement corresponding to the predetermined hopping sequence defined for said block by the predetermined code.

12. A system according to claim 9, comprising a programmable switching circuit for connecting the cells of the SAWD to the filters in a programmable arrangement;

a code generator connected to the switching circuit for programming the switching circuit to connect the cells of the SAWD to the filters so that all of the signals that are provided from the switching circuit to the SAWD during any selected sequential block are either one polarity or an opposite polarity in accordance with a predetermined binary code; and wherein the detecting means of the integrating means detects when the serial output of the SAWD exceeds a first predetermined threshold to determine arrival of a sequential block of one binary value and further detects when said serial output exceeds a second predetermined threshold to determine the arrival of a sequential block of the opposite binary value.

13. A system for demodulating a plurality of unique received signals, wherein each unique signal contains repetitive blocks of m frequency hopped pulses having a unique predetermined hopping sequence, wherein "m" is an integer greater than one, comprising a plurality of demodulator modules, wherein each module includes m filters respectively tuned to the frequencies of a unique predetermined hopping sequence;

means for distributing said received signal to all m filters in parallel; and means for integrating the output signals from said filters over intervals each corresponding to a respective one of said blocks of pulses, said integrating means comprises a signal accumulator having a series of cells respectively coupled to the different filters, wherein signals are accumulated in the cells from the filters at the integer-multiple of the hop rate and accumulated signals progress serially from cell to cell at the integer-multiple of the hop rate to provide a serial output from an end cell, and means for detecting when the serial output of the accumulator exceeds a predetermined threshold to determine the arrival of each block.

14. A system according to claim 8, wherein the filters are optical RF bandpass filters.

15. A system for demodulating a received signal containing repetitive blocks of m frequency hopped pulses selected from nm frequencies having a predetermined hopping sequence, wherein "m" and "n" are integers greater than one, and wherein the predetermined hopping sequence may vary from one block to the next, with the hopping sequence for each block being defined by a predetermined code, the system comprising nm filters respectively tuned to said nm frequencies;

means for distributing said received signal to all nm filters in parallel;

means for integrating during each interval corresponding to each block the output signals from selected filters tuned to the m frequencies that are selected during each sequential block to determined the arrival of each block:

a programmable switching circuit for connecting the integrating means to the selected filters in a programmable arrangement; and a code generator connected to the switching circuit for programming the switching circuit to connect the integrating means to selected filters in accordance with the predetermined code so that during each sequential block the integrating means integrates the respective filter output signals in a serial arrangement corresponding to the predetermined hopping sequence defined for said block by the predetermined code.

16. A system according to claim 15, wherein the integrating means comprises a signal accumulator having a series of cells respectively coupled to different filters, wherein signals are accumulated in the cells from the filters at the integer-multiple of the hop rate and accumulated signals progress serially from cell to cell to provide a serial output from an end cell; and means for detecting when the serial output of the accumulator exceeds a predetermined threshold to thereby determine the arrival of each block.

17. A system according to claim 16, wherein the programmable switching circuit and the code generator cooperate to cause all of the signals that are provided from the switching circuit to the accumulator during any given sequential block to be either one polarity or an opposite polarity in accordance with a binary output aspect of the predetermined code; and wherein the detecting means of the integrating means detects when the serial output of the accumulator exceeds a first predetermined threshold to determine arrival of a sequential block of one binary value and further detects when said serial output exceeds a second predetermined threshold to determine arrival of a sequential block of the opposite binary value.

18. A system according to claim 17, wherein the programmable switching circuit comprises m differential circuits having their outputs respectively connected to the cells of the accumulator, wherein each differential circuit has two opposite polarity inputs;

means for reversing the polarity of a signal received at one input; and means for combining the reversed polarity input signal with a signal received at the other input to produce an output signal that is provided to the cell of the accumulator;

m switches respectively connecting the inputs of the m differential circuits to the outputs of different pairs of 2m filters, wherein each of the switches is programmable for selectively reversing the connections between the two differential circuit inputs and the pair of filter outputs in accordance with the predetermined code; and wherein the code generator programs the programmable switching circuit so that one filter of each pair of filters passes signals having one of the selected frequencies during each sequential block and so that all of the signals having the selected frequencies during each sequential block are provided to an input of the same polarity in the differential circuits to cause all of the signals that are provided to the accumulator during any given sequential block to be either one polarity or the opposite polarity in accordance with said binary output aspect of the predetermined code.

19. A system according to claim 16,
wherein the code generator is connected to the switching circuit for programming the switching circuit to connect the cells of the accumulator to the selected filters during each sequential block in a serial arrangement corresponding to the predetermined hopping sequence defined for said block by the predetermined code.

20. A system according to claim 15, wherein the integrating means comprises a clocked signal accumulator, such as a charge coupled device, having a series of cells respectively coupled to different filters, wherein when the accumulator is clocked, signals are accumulated in the cells from the filters and accumulated signals progress serially from cell to cell to provide a serial output from an end cell;

means for clocking the input and the serial progression of the accumulator at the integer-multiple of the hop rate; and means for detecting when the serial output of the accumulator exceeds a predetermined threshold to thereby determine the time of arrival of the last pulse of each block.

21. A system according to claim 15, wherein the integrating means comprises a surface acoustic wave device (SAWD) having a series of cells respectively coupled to different filters and spaced so that the time required for a surface wave to propagate between adjacent cells corresponds to the interval between frequency hops said surface wave provided as a serial output from the SAWD;

an array of modulators respectively connected in series between the respective cells of the SAWD and the filters of the filter array for driving the respective cells in proportion to the amplitude of the corresponding filter output; and means for detecting when the serial output of the SAWD exceeds a predetermined threshold to thereby determine the arrival of each block.

22. A system according to claim 15, wherein the filters are optical RF bandpass filters.

* * * * *

UNITED STATES PATENT AND TRADEMARK OFFICE
CERTIFICATE OF CORRECTION

PATENT NO. : 4,553,101
DATED : November 12, 1985
INVENTOR(S) : Ronald F. Mathis

It is certified that error appears in the above-identified patent and that said Letters Patent are hereby corrected as shown below:

Column 9, line 61, change "turned" to --tuned--.

Signed and Sealed this

Twenty-ninth Day of April 1986

[SEAL]

*Attest:*

DONALD J. QUIGG

*Attesting Officer*    *Commissioner of Patents and Trademarks*